United States Patent [19] | [11] 4,210,918
Hoffmann et al. | [45] Jul. 1, 1980

[54] INK JET PRINTER

[75] Inventors: Klaus Hoffmann, Leverkusen; Detlef Döppner, Cologne, both of Fed. Rep. of Germany

[73] Assignee: Agfa-Gevaert Aktiengesellschaft, Leverkusen, Fed. Rep. of Germany

[21] Appl. No.: 859,486

[22] Filed: Dec. 12, 1977

[30] Foreign Application Priority Data

Dec. 17, 1976 [DE] Fed. Rep. of Germany ....... 2657360

[51] Int. Cl.[2] ............ G01D 15/18
[52] U.S. Cl. ............ 346/75; 346/140 R
[58] Field of Search ............ 346/75, 140 R

[56] References Cited

U.S. PATENT DOCUMENTS 3,611,422 10/1971 Rourke ............ 346/75
4,023,183 5/1977 Takano ............ 346/75

OTHER PUBLICATIONS

Helinski, E. F.; Ink Drop Catcher, IBM Tech. Disc. Bulletin, vol. 19, No. 4, Sep. 1976, pp. 1205-1206.

*Primary Examiner*—Joseph W. Hartary
*Attorney, Agent, or Firm*—Connolly & Hutz

[57] ABSTRACT

The invention relates to an ink jet printer comprising at least one nozzle from which ink is adapted to issue under high pressure in the form of fine droplets, a charging apparatus for charging the droplets, a deflector unit, a collecting apparatus provided with a knife edge for collecting and discharging droplets of a specific charge, and a recording support arranged downstream of the movable knife edge wherein the collecting apparatus is provided with a cleaning device and an extraction device which are such that a new or freshly cleaned part of the knife edge always faces droplets being separated.

3 Claims, 7 Drawing Figures

INK JET PRINTER

The invention relates to an ink jet printer comprising at least one nozzle from which the ink issues under high pressure, a charging arrangement for charging the droplets, a deflector unit, a collecting apparatus provided with a knife edge, for collecting and discharging droplets having a certain charge, and a support for recording the information arranged behind the preceeding components.

A method of applying information in the form of graphic or alphanumeric symbols on moving recording supports (sheet of paper) is known, in which a marking liquid (ink) is expelled through nozzles and the droplets thus formed charged electrically and deflected in an electric or magnetic field so that they either reach the recording support or enter an ink collector, depending upon the charge (U.S. Pat. No. 3,596,275).

Unlike conventional printing methods this ink injecting method does not require mechanically moving parts. The direction in which the droplets travel may be predetermined by modulating the voltage with which the droplets are charged at their time and place of formation, and information can be contained in the jet in this way and this information applied to the recording support.

The method is therefore particularly suitable for applying in the form of symbols information which is only received once or which changes rapidly. This information is formed by electrical signals obtained by scanning optical patterns, or purely synthetically by means of electronic symbol generators. This method is particularly important for addressing objects such as letters, documents or containers and also for marking strips of material which may be moved past the droplet generator at high speed.

In this method, in which the ink jet either reaches the recording support or enters an apparatus for collecting the excess ink, depending upon its charge, the area of transition from the recording support to the collecting apparatus is of particular significance. This transitional area is normally formed by a sharp edge or cutter. It has been found that, in the course of time, droplets are deposited on the sharp edge which impair the precision of the devices. In particular when using devices having a high ink flow-rate ($\geqq 10^3$ mm$^3$/s) and marking liquids (inks) which evaporate rapidly, there is a risk of some of the droplets falling on the sharp edge remaining suspended there and of a layer of dye gradually being deposited there owing to the rapid evaporation of the solvent for the ink dye. This layer of dye leads to a lack of definition in the geometric position of the sharp edge and thus impairs the picture recording.

According to the invention there is provided an ink jet printer comprising at least one nozzle from which ink is adapted to issue under high pressure in the form of fine droplets, a charging apparatus for charging the droplets, a deflector unit, a collecting apparatus provided with a knife edge for collecting and discharging droplets of a specific charge, and a recording support arranged downstream of the knife edge wherein the collecting apparatus is provided with a cleaning device and an extraction device are such that a new or freshly cleaned part of the knife edge always faces droplets being separated.

In an advantageous embodiment of the invention, the knife edge is movable perpendicularly to the axis of the ink jet and perpendicularly to the direction of deflection. A continuous cleaning effect is achieved by means of cleaning cushions lying tightly against the knife edge and communicating with an extraction apparatus.

The advantage of the invention lies in the fact that the collecting apparatus can function uninterruptedly for long periods. The invention eliminates a substantial source of trouble which formerly arose particularly after a long period of operation.

Figure 1:
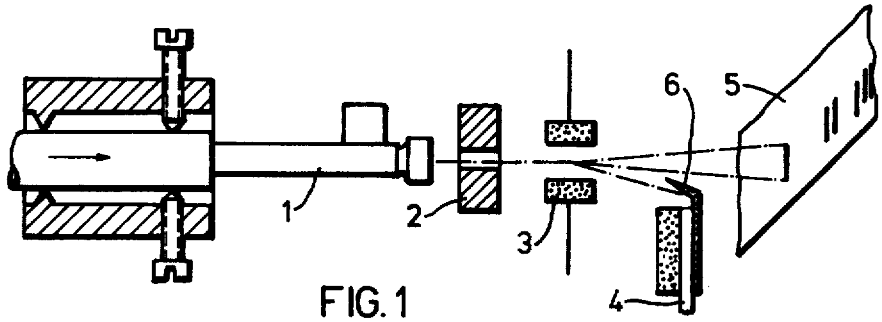
FIG. 1 shows the basic structure of an ink jet printer.

The ink jet printer shown in FIG. 1 comprises a droplet producer 1, an annular electrode 2 for charging the droplets to correspond to the picture, a deflector unit 3, a collecting apparatus 4 for the excess droplets and a recording support 5.

Figure 2:
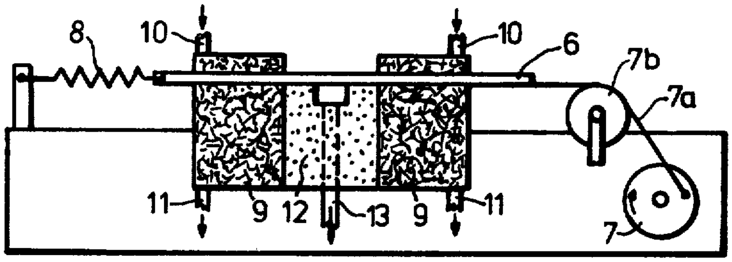
FIG. 2 shows a collecting apparatus with an oscillating knife edge and cleaning apparatus.

The ink is supplied to the droplet producer 1 under high pressure and leaves the outlet nozzle at ultrasonic speed in the form of small droplets of substantially uniform velocity and direction. The droplets are charged by the annular electrode 2 to correspond to the picture information and are deflected by the deflector unit 3, a plate capacitor, according to their charge. All droplets the deflection of which exceeds a predetermined angle, enter the collecting apparatus 4 past a knife edge 6 and are separated off. In FIG. 2, the knife edge 6 is formed as a rail which reciprocates longitudinally, that is to say perpendicularly to the axis of the jet. The knife edge 6 is connected to an eccentric drive mechanism 7 via a flexible strip 7*a* and a roller 7*b* and to a return spring 8. Two cleaning cushions 9 are located to the right and left of the cutting centre and lie against opposite sides of the knife edge 6. The cleaning cushions 9 are provided with feed pipes 10 for a cleaning agent and extraction pipes 11. The separated droplets are collected in the region of a sintered metal block 12 and are discharged through an extraction pipe 13. A polyurethane foam, for example, is a suitable material for the cushions. Advantageously, the cleaning agent used is the pure solvent for the ink dye.

Figure 3:
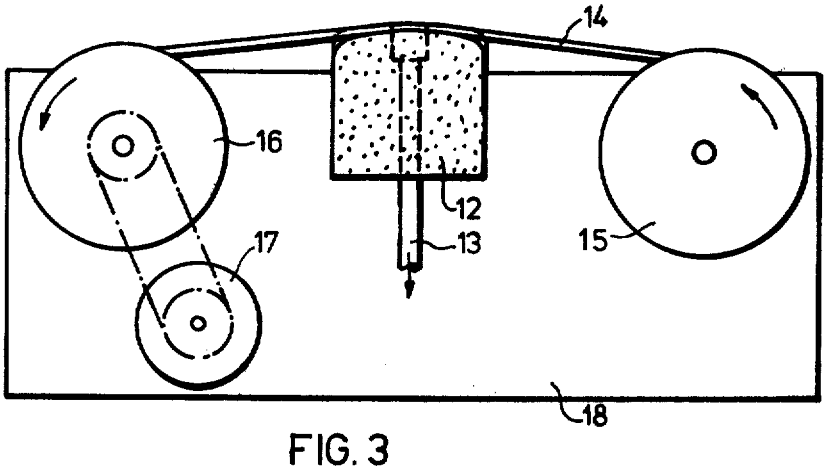
FIG. 3 shows a collecting apparatus with a strip-shaped knife edge.

In the collecting apparatus shown in FIG. 3, the knife edge is in the form of a flexible strip 14. It is a thin strip made of metal or plastic material which is unwound continuously from a supply roll 15, fed via the sintered metal block 12 with extraction pipe 13 and wound up again on the other side thereof by a take-up roll 16. The take-up roll 16 is driven by a motor 17. The guide for the strip 14 and the drive are mounted on a common support plate 18 which is installed perpendicularly to the axis of the ink jet. Since it is only necessary to have a very slow strip velocity, for example $10^{-4}$m/sec and the strip may be very thin (for example 15/$\mu$m), and it only needs to be exchanged very infrequently. The collecting apparatus therefore functions continuously with a clean knife edge. An additional cleaning arrangement is not needed.

Figure 4:
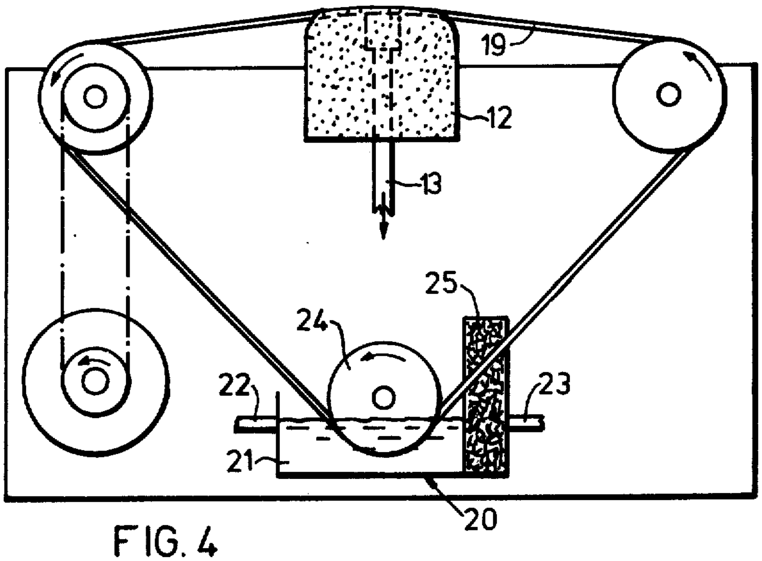
FIG. 4 shows a collecting apparatus with a revolving strip-shaped knife edge and a cleaning apparatus.

The collecting apparatus in FIG. 4 also uses a strip-shaped knife edge. In contrast to the embodiment in FIG. 3, however, the knife edge is in the form of a revolving strip 19. In this embodiment, the endless strip 19 passes through a cleaning apparatus 20 which is arranged on the support plate 18 beneath the sintered metal block 12. The cleaning apparatus 20 comprises a bath 21 filled with solvent and having a cleaning agent feed pipe 22 and a cleaning agent extraction pipe 23. The cutting strip 19 in the region of the cleaning apparatus is fed round a guide roller 24 in such a way that it is constantly submerged in the bath 21 filled with solvent and subsequently passes through a drying sponge 25 which removes adherent droplets. When a rapidly drying solvent is used, this drying sponge 25 may be dispensed with.

Figure 5:
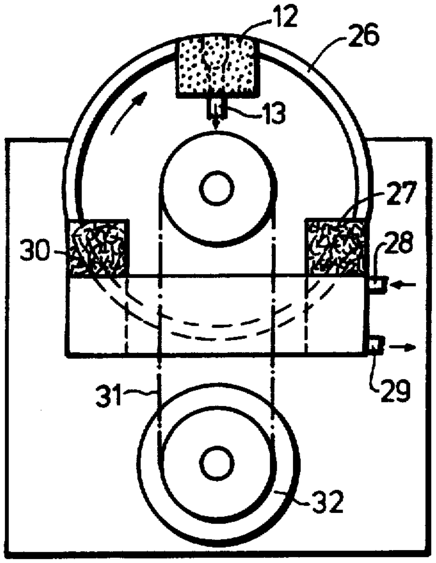
FIG. 5 shows a collecting apparatus with a wheel-shaped knife edge as seen in the direction of the axis of the ink jet.
Figure 6:
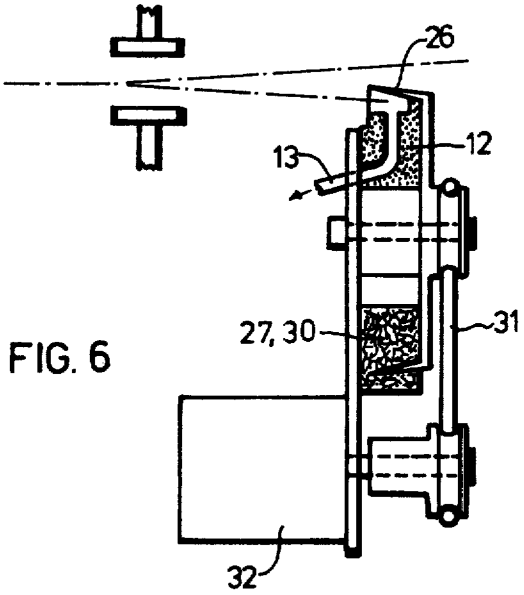
FIG. 6 shows the collecting apparatus of FIG. 5 as seen perpendicularly to the axis of the ink jet.

In FIGS. 5 and 6, the knife edge of the collecting apparatus is in the form of a circular disc 26. After passing the axis of the jet, the contaminated area of the circumference of the knife edge runs past a cleaning sponge 27 on which cleaning fluid is continuously supplied from a cleaning agent feed pipe 28 and discharged through a cleaning agent extraction pipe 29. It has been found that it is important to rinse the cleaning sponge continuously as otherwise there is an increase in dirt particles. A dry sponge 30 is arranged on the opposite side and also rests tightly against both sides of the circular disc 26. As in the previously described collecting apparatus, a sintered metal block 12 with an extraction pipe 13 is located in the region which forms the ink jet boundary (at a vertex in this case). The circular disc 26 is continuously driven via a belt 31 by a geared motor 32. The arrangement of the knife wheel 26 in relation to the ink jet is shown in FIG. 6 which also shows the shape of the circular disc (approximately U-shaped in section).

Figure 7:
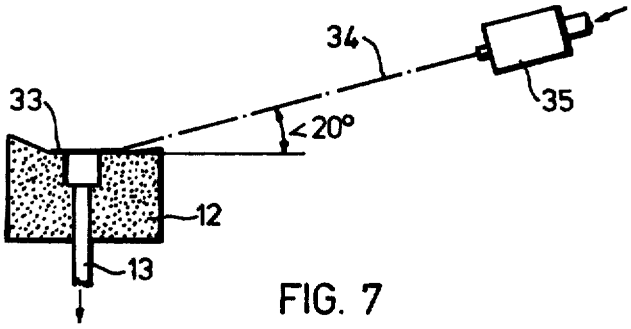
FIG. 7 shows a collecting apparatus in which the knife edge is cleaned with a liquid jet.

As shown in FIG. 7, the limiting knife edge on the collecting apparatus may also be cleaned continuously while the ink jet printer is in operation by directing a fine jet of solvent on to the knife 33 at an acute angle. The knife edge 33 is again embedded in a porous material, for example a sintered metal block which is provided with an extraction pipe 13 as in the preceding examples. A jet of solvent 34 is directed by a nozzle 35 so as to strike the knife edge 33 adjacent the point when the ink jet passes it. In practice, the angle of impact for the jet of solvent is less than 20°. The distance between the point of impact and the ink jet plane is a few millimeters. The nozzle 35 has a diameter of about 40 $\mu$m and operates at a pressure of from 2 to 3 bar. The injected solvent, together with the excess ink, is continuously drawn through the sintered metal block. In this way, the critical portion of the knife edge 33 is continuously rinsed by a thin moving film of liquid which prevents solid particles of dye from being deposited.

In this embodiment, and those of FIGS. 2 to 6, sintered polyethylene or a porous ceramic material may be used instead of a sintered metal.

What we claim is:

1. An apparatus for recording information in the form of symbols by issuing from a nozzle a jet of fine ink droplets under high pressure having a rapidly drying solvent, a recording support for receiving said jet, a collecting apparatus provided with a receiving surface arranged intermediate said nozzle and said recording support, means for charging the droplets with an electrical charge and deflecting the charged particles in a field and in accordance with said charge to cause the charged particles to selectively impinge on the recording support or on the collecting apparatus, wherein the collecting apparatus comprises in combination;

a separating member having a surface capable of receiving said ink droplets and a knife edge defined by one edge of said surface, a porous extraction member adjacent to the knife-edged separating member, at least two spaced porous cleaning devices bearing against the separating member, means supplying a cleaning solvent to said cleaning devices, said cleaning devices being capable of removing ink from the knife edge and the receiving surface and means for moving the separating member laterally across both said porous extraction member and said spaced cleaning devices to continuously provide said knife edge and said receiving surface adjacent said extraction member free of an accumulation of the ink.

2. Apparatus according to claim 1, wherein said knife edge of said surface of said separating member is movable perpendicularly to the axis of the ink jet and the two cleaning devices are located to the right and the left of the extraction member, and rest against said knife edge and communicate with the extraction member.

3. Apparatus as claimed in claim 1 wherein the issuing jet of ink has a flow-rate of $\geqq 10^3$ mm3/s.

* * * * *